United States Patent [19]

Proulx

[11] Patent Number: 4,959,904

[45] Date of Patent: Oct. 2, 1990

[54] SIMPLE FLAIL FEEDOUT MECHANISM FOR A ROTARY MOWER

[76] Inventor: Raymond E. Proulx, 8409 Utica Ave., Rancho Cucamonga, Calif. 91730

[21] Appl. No.: 377,772

[22] Filed: Jul. 7, 1989

Related U.S. Application Data

[63] Continuation of Ser. No. 306,279, Feb. 2, 1989, abandoned, which is a continuation of Ser. No. 928,837, Nov. 10, 1986, abandoned.

[51] Int. Cl.$^5$ .............................................. B26B 7/00
[52] U.S. Cl. ....................................... 30/276; 30/347
[58] Field of Search ................... 30/276, 347; 56/12.7

[56] References Cited

U.S. PATENT DOCUMENTS 4,672,798  6/1987  Ota ........................................ 30/276

Primary Examiner—Douglas D. Watts
Attorney, Agent, or Firm—Boniard I. Brown

[57] ABSTRACT

An improvement for flail cutter heads so that additional flail can be fed from the device by merely bumping its rotating body on the ground. A pair of disc-shaped cams are readily mounted on the centerline of the body on the opposite radial sides of a spool around which the flails are wound. The disc-shaped cams interact with facing cam followers on the inner surfaces of spool covers forming the major portions of the body so that when the lower cam is moved axially out of contact with the lower follower, by bouncing a downwardly biased, axially mounted bumper member on the ground, the other has already moved axially upwardly in position for engagement with the upper follower. This engagement occurs after a predetermined rotation of the spool. Once the bounce is over, the upper cam moves axially in the reverse direction, disengaging the upper cam follower after the lower cam is in position the contact the lower cam followers after another predetermined of rotation. The resulting two stage relative rotation of the spool allows predetermined lengths of flail to be fed out through the body of the head.

14 Claims, 4 Drawing Sheets

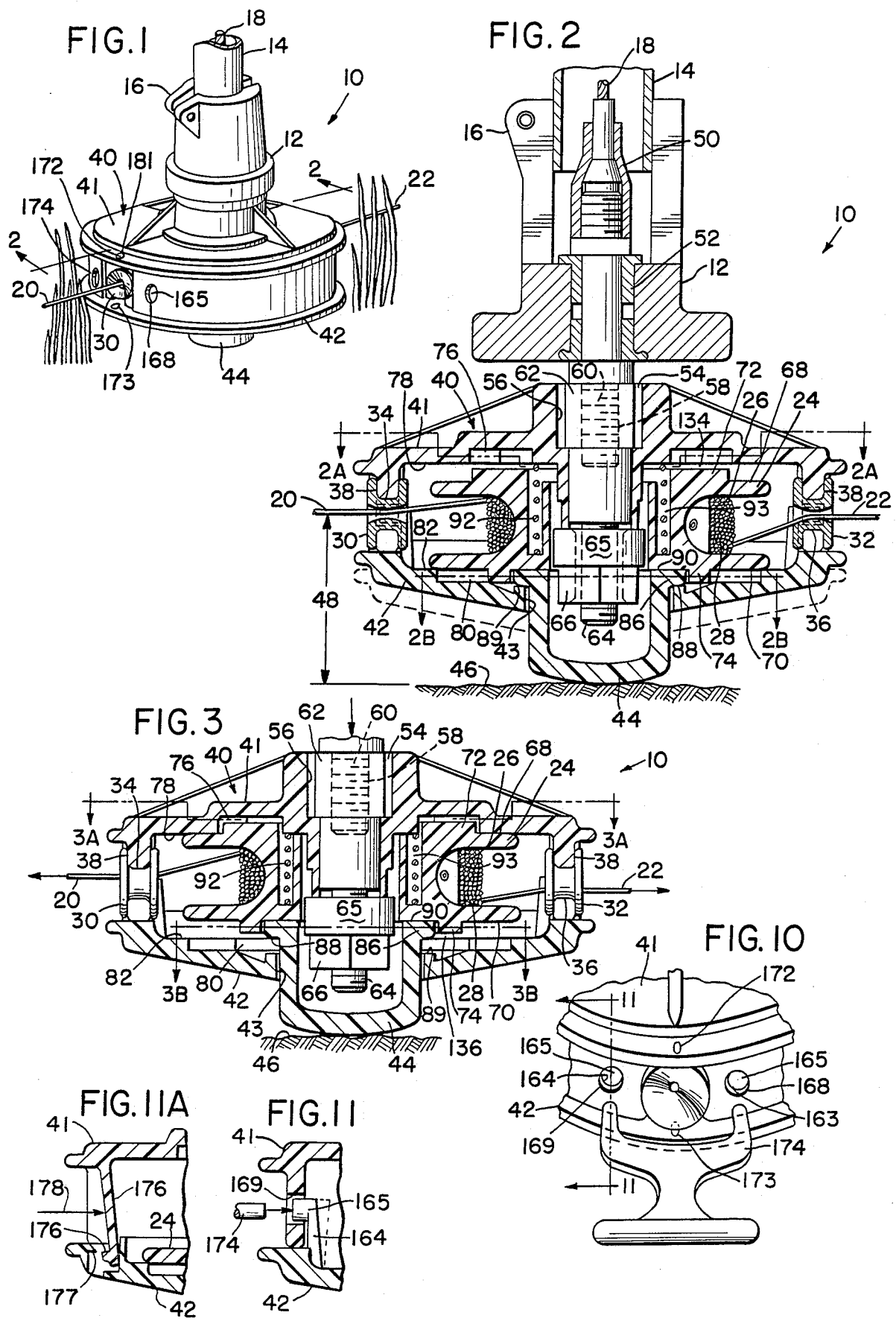

SIMPLE FLAIL FEEDOUT MECHANISM FOR A ROTARY MOWER

This is a continuation of co-pending application Ser. No. 07/306,279 filed on Feb. 2, 1989, which is a continuation of Ser. No. 06/928,837 filed on Nov. 10, 1986, now abandoned.

CROSS REFERENCE TO RELATED PATENTS

The present invention is related to U.S. Pat. No. 4,259,782, entitled "Flail Feedout Mechanism for Rotary Mower," and U.S. Pat. No. 4,458,419 entitled, "Simplified Flail Feedout Mechanism for a Rotary Mower" both by Raymond E. Proulx, which are hereby incorporated by reference as though fully set forth hereinbelow.

BACKGROUND OF THE INVENTION

This invention relates to improved flail feedout means for mowing and trimming devices used to trim grass, weeds, and other vegetation, of the rotary type equipped with flexible cord-like flails formed of generally cylindrical fibers. Grass and weed cutters of this general type are now widely used. Examples are described in REBER, U.S. Pat. No. 3,664,102; BALLAS et al, U.S. Pat. No. 3,826,068; MIZUNO et al, U.S. Pat. No. 4,020,552; BALLAS et al, U.S Pat. No. 4,035,912; PROULX, U.S. Pat. No. 4,097,991; PERDUE, U.S. Pat. No. 4,134,204; TORO, Belgium Patent No. 852,150; PROULX, U.S. Pat. No. 4,145,809; PROULX, U.S. Pat. No. 4,203,212; and PROULX, U.S. Pat. No. 4,259,782.

Such devices are available on the market having automatic flail feedout mechanisms which respond to a bump on the ground intentionally applied by the operator or by application of force applied thereto by some mechanical arrangement. Such mechanisms usually consist of a dog or friction clutch located between a spool of flail and the case thereabout through which the flail is fed. By bumping an extension of the spool on the ground, the friction clutch is disengaged for a length of time dependent on the duration of the bump. The dog clutch released by the bump then abruptly engages at the next opportunity to feed out flail in segment lengths which are related to the engagement points of the dog clutch. Such dog clutches have outwardly extending ribs which engage inwardly extending abutment tangs and therefore depend upon a skillful bump when it is desired that they deliver only one segment length. However, friction within the device and over zealous bumping can result in two or more line segments being fed out, especially when the device has been in use and the corners on the ribs and tangs have worn so that positive engagement is no longer assured. The unavoidable abrupt operation of the dog clutch causes the wear to take place. Therefore, there has been need for a feedout mechanism which automatically feeds out a predetermined length of flail per bump, which does not lose this capability with extended use, and which is easy to construct and maintain.

Other mowers such as are shown in Applicant's U.S. Pat. Nos. 4,203,212 and 4,259,782 include flail feedout means. These means have a downwardly projecting bumper as part of the flail spool which normally is used to space the flail above the surface in the plane in which the vegetation is cut. This spool, bumper and an intermediate member, as an assembly, are spring loaded downwardly with respect to the spinning housing. Extending inwardly from the intermediate cylinder are tangs which ride in a serpentinous cam slot in a cam member fixed to the housing. When the bumper is bumped on the ground, the intermediate cylinder is moved upwardly so that its tangs ride up relatively vertical cam surfaces until they reach spiral surfaces which extend downwardly to the next vertical cam surface. The net effect is that the spool connected to the intermediate members and the housing connected to the cam member rotate relative to each other to allow a predetermined length of flail to feed out by centrifugal force. This system works well, but the serpentinous cam is not as economical to manufacture as is desired and the tangs, no matter how they are multiplied, can only present a limited contact area for engagement to the serpentinous cam.

In U.S. Pat. No. 4,458,419, a pair of disc-shaped cams are radially mounted on the centerline of the cutter oriented at 45° to each other. They interact with a single cam follower so that when a first cam is moved axially out of contact with the follower, by bumping of the rotating body on the ground, the other moves axially into engagement with the follower after a 45° rotation. Once the bump is over, the second cam moves axially in the reverse direction, disengaging the cam follower and allowing another 45° of rotation before the first cam, repositioned by the axial movement comes into abutment contact with the cam follower. The 90° rotation allows a predetermined length of flail to be fed out through the body of the device. Unfortunately, some of the parts of the mechanism of the 4,458,419 patent are relatively complex to mold and tabs forming part of the follower assembly can fail after prolonged abuse.

Therefore, there has been a need for a flail feedout mechanism which operates as effectively and reliably as those shown in U.S. Pat. Nos. 4,259,782 and 4,458,419, which can be manufactured at a lower cost, and which is even more reliable in service.

SUMMARY OF THE INVENTION

The present simplified rotary mowing and trimming device employs a flail feedout constructed on the same basic plan as those shown in Applicant's U.S. Pat. No. 4,259,782 and 4,458,419. The mower includes a handle with drive means which are connected to a spinning housing which contains a spool of one or more coils of filaments used for flails, one or more orifices so that the flails can be fed out through the housing into cutting positions, and cam means which normally restrict relative rotation between the spool and the housing. The cam means allow, upon bumping of a downwardly biased bumper member on the ground, a predetermined relative rotation between the spool and the housing so that a predetermined length of flail can be fed out of the orifices. The bumper member normally is used to space the flail above the surface on which the vegetation is being cut. The spool and bumper are spring loaded axially downwardly.

The cam means include cams on the upper and lower outer radial surfaces of the spool. The housing includes upper and lower portions which surround the spool. A lower cam follower is formed in an upper inner radial surface of the lower portion of the housing. The lower cam member includes a plurality of generally inwardly facing abutment surfaces arrayed about the axis of rotation of the housing. Under normal circumstances, the lower cam is held by the spring loading into engagement with the cam follower abutment surfaces of the lower cam to connect the housing and spool together in a manner to prevent relative rotation therebetween. When the bumper is bounced on the ground, its upper surface moves the spool upwardly disengaging the lower cam from the lower cam follower after a similar upper cam in the upper outer radial surface of the spool, oriented rotationally at a predetermined angle thereto, has moved in position to engage the abutment surfaces of an upper cam follower. After the predetermined angle of relative rotation of the spool and housing, the upper cam and follower engage, stopping relative rotation of the spool and housing. Once the force of the bounce has been dissipated, the spring loading returns the spool and bumper member back to their original relative positions, releases the upper cam from the abutment surfaces of the upper cam follower after the lower cam is in position to re-engage the lower cam follower, and allows another predetermined angle of relative rotation for a total twice the predetermined angle. This provides the desired relative rotation between the housing and the spool to feed flail out through the orifices. The cams themselves preferably are of identical square configuration although other regular shapes, such as triangles and pentagons, can be used. Since the cams are formed on the upper and lower radial surfaces of the spool for interacting with simple, inwardly facing, cam follower surfaces formed on the inner surfaces of the upper and lower portions of the housing, the release mechanism is relatively economical to manufacture. Also, since large abutment surface areas are presented between the cams and the cam followers, the mechanism is extremely robust, trouble-free and reliable.

It is therefore an object of the present invention to provide simplified means for automatically feeding flail out of a rotary mower while maintaining the advantageous operational features of prior mowers.

Another object is to provide automatic flail feedout means which are reliable, easy and economical to manufacture, and reliable in the harsh environments in which mowers are used.

Another object is to provide a mower which feeds out a predetermined amount of flail when desired.

Another object is to distribute the load and wear forces equally through the feedout means of a rotary flail cutter head.

Another object is to provide an automatic flail feedout mechanism whose engagement surfaces have a relatively large contact area to reduce the pressure applied thereto.

These and other objects and advantages of the present invention will become apparent to those skilled in the art after considering the following detailed specification which cover preferred embodiments thereof in conjunction with the accompanying drawings wherein:

BRIEF DESCRIPTION OF THE DRAWINGS

FIG. 1 is a perspective view of a complete mower cutting head constructed according to the present invention, in cutting position on the ground;

FIG. 2 is a cross-sectional side view of the cutting head of FIG. 1, showing its normal relationship with respect to the ground;

FIG. 3 is a cross-sectional view similar to FIG. 2 of the automatic flail feedout mechanism employed in the mower of FIGS. 1 and 2 one quarter way through its flail feeding operation;

FIG. 4A and 4B are cross-sectional views similar to FIGS. 2A and 2B, and 3A and 3B showing the relative positioning of the upper cam and upper follower (FIG. 4A) and the lower cam and lower follower (FIG. 4B) halfway through the flail feeding operation;

FIG. 10 is a perspective view showing the details of the housing disassembly feature for the present invention;

FIG. 11 is a cross-sectional view taken on line 11—11 of FIG. 10;

FIG. 11A is a cross-sectional view similar to FIG. 11 showing alternate retention means;

DETAILED DESCRIPTION OF THE PREFERRED EMBODIMENTS

Figure 2A:
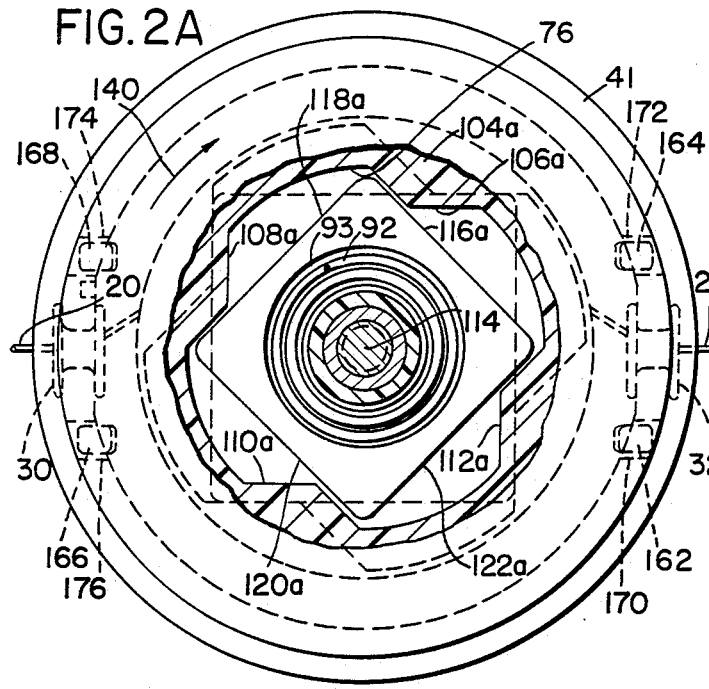
FIG. 2A is a cross-sectional view taken on line 2A—2A in FIG. 2 showing the positional relationship of the upper cam and upper follower.

Referring to the drawings more particularly by reference number, 10 in FIG. 1 refers to a cutting head of a flail-type vegetation cutter. The cutting head 10 is mounted for rotation on a bearing block 12 which is fastened to a hollow handle 14 by means such as the friction clamp portion 16 of the bearing block 12. The cutting head 10 is rotated by a flexible shaft 18 which passes through the handle 14 and is rotatably driven by suitable motor means (not shown). One or more filamentous flexible flails 20 and 22 are impelled into a radially extending attitude by the centrifugal force generated by the rotation of the head 10. The flails 20 and 22 cut grass or other vegetation by whip-like impact. The flails 20 and 22 preferably are constructed from nylon monofilament which is stored on a spool 24 in co-wrapped coils 26 and 28, respectively, as shown in FIG. 2. The flails 20 and 22 extend outwardly from the coils 26 and 28 through grommets 30 and 32 which are held in slots 34 and 36, respectively in the cylindrical skirt portion 38 of the cutting head 10.

The cutting head 10 includes a housing 40 made in two main components, upper housing portion 41 and a lower housing portion 42. The lower housing portion 42 includes an axial opening 43 through which a downwardly projecting bumper 44 extends. The bumper 44 is designed for relatively frictionless spinning contact with the ground 46. The main function of the bumper 44 is to allow the operator to accurately gauge the height 48 of the flails 20 and 22 above the ground 46.

As can be seen in FIG. 2, suitable shaft means 50 are connected to the flexible shaft 18 and extend through a bearing 52 in the bearing block 12 down into the housing 40 to spin the housing 40 relative to the block 12. The housing 40 includes a stud support member 54 which extends into a stepped orifice 56 in the housing 40 and includes an upwardly facing threaded bore 58 for engagement with the shaft means 50, and a downwardly extending screw 60. The screw 60 is threadably engaged by a metal insert 62 usually molded into the upper housing portion 41. The metal insert 62 extends through the upper housing portion 41, it having a bolt structure 64 extending from its lower side for engagement by a spacer 65 and nut 66 to retain the insert 62 to the housing upper portion 41. This assures that the housing 40 turns with the flexible shaft 18 as it is being driven.

Figure 2B:
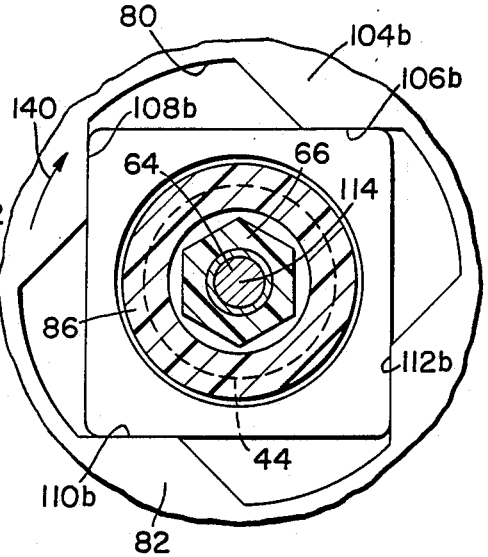
FIG. 2B is a cross-sectional view taken on line 2B—2B in FIG. 2 showing the positional relationship of the lower cam and lower follower.

The spool 24 includes upper and lower radial surfaces 68 and 70 on which are formed upper and lower cams 72 and 74 respectively. When the head 10 is in its normal condition as shown in FIG. 2, the upper cam 72 as shown in FIG. 2A is disengaged from its cam follower 76 formed in the lower radial surface 78 of the upper housing portion 41, which the lower cam 74 is engaged with the lower cam follower 80 formed in the upper radial surface 82 of the lower housing portion 42, as shown in FIG. 2B. The cams 72 and 74 are shown rotated 45° from each other while the cam followers 76 and 80 are aligned. It will become clear from the following that the cams 72 and 74 could be aligned and the cam followers 76 and 80 be 45° out of alignment or everything could be out of alignment so long as the 45° relative operational relationship is maintained.

Figure 3A:
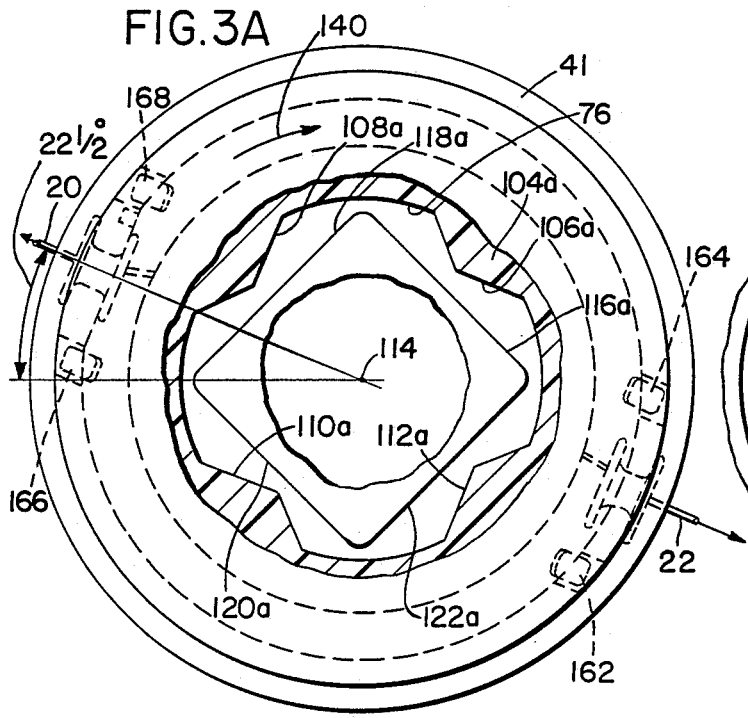
FIG. 3A is a cross-sectional view taken on line 3A—3A in 3 showing the positional relationship of the upper cam and upper follower.
Figure 3B:
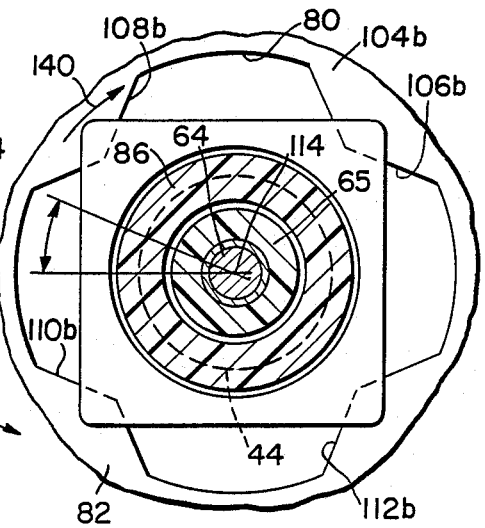
FIG. 3B is a cross-sectional view taken on line 3B—3B in FIG. 3 showing the positional relationship of the low lower follower.
Figure 4A:
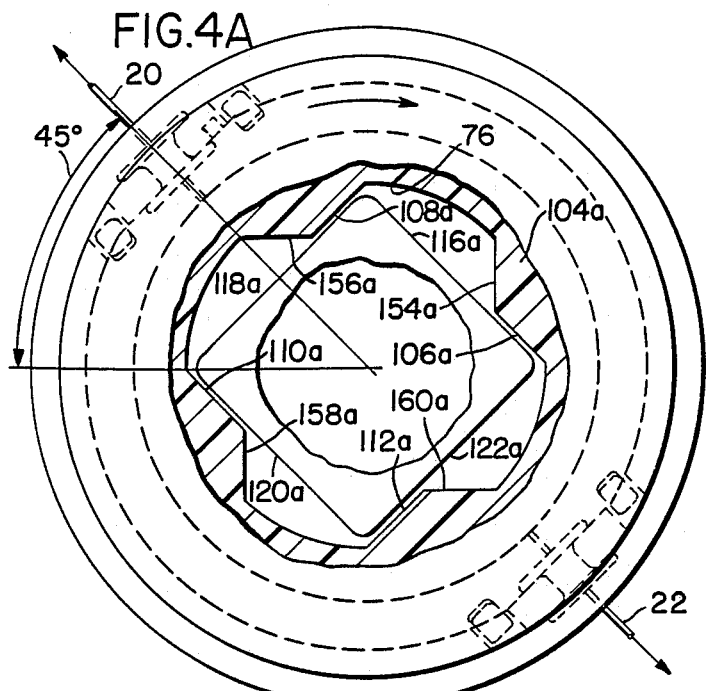
Figure 5B:
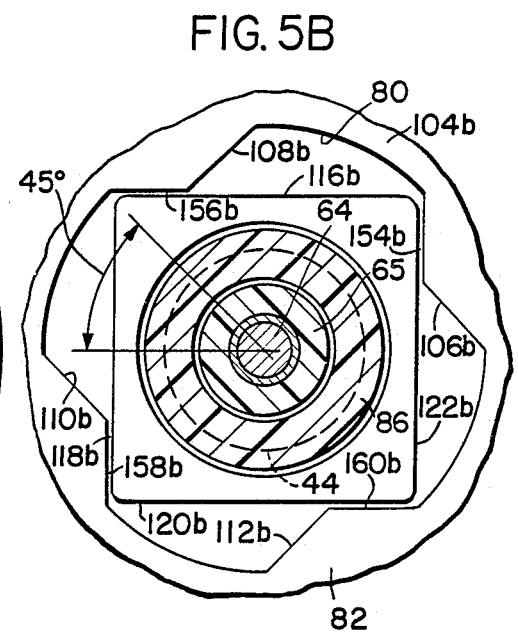
FIG. 5 is an exploded view of the automatic flail feedout mechanism.

When it is desired to increase the length of the flails 20 and 22 by feeding additional filament from the coils 26 and 28, the head 10 is lifted and then bounced on the ground 46 so that the bumper 44 abruptly contacts the ground 46. The bumper 44 is retained within the central axial opening 43 in the lower housing portion by means of an integral collar 86 whose lower surface 88 is normally held in engagement against a radial surface 89 parallel to the upper radial surface 82 of the lower housing portion 42. The force generated by bouncing the bumper 44 on the ground is transferred from the upper surface 90 of the collar 86 to the lower radial surface 70 of the spool 24. This force compresses a spring 92 positioned in a cylindrical pocket 93 in the spool 24 which continuously biases the spool 24 downwardly away from the lower radial surface 78 of the upper housing portion 41. The movement of the spool 24 against the bias of the spring 92 brings the upper cam 72 up into position where it can engage the upper cam follower 76 before the lower cam 74 disengages it from the lower cam follower 80. Once the lower cam 74 disengages from the lower cam follower 80, the centrifugal force of the flails 20 and 22 act against any friction caused by the spring 92 between the spool 24 and the housing 40 to allow relative rotation. In FIGS. 3A and 3B 22° of relative rotation has occurred and neither upper or lower cams 72 and 74 are engaged with the upper and lower cam followers 76 and 80 respectively. The rotation continues until, as shown in FIGS. 4A and 4B, the upper cam 72 engages the upper cam followers 76 stopping for the moment any relative rotation between the housing 40 and the spool 24.

Once the inertial forces of the bumper 44 striking the ground can be overcome by the spring 92, the spool 24 starts moving downwardly. The upper cam 72 only disengages from the upper cam follower 76 when the lower cam 74 has descended enough to be in position to engage with the lower cam follower 80. Thus in the four lobed embodiment, heretofore discussed, one 90° relative rotation between the housing 40 and the spool 24 is generated per bump.

As shown in FIGS. 2A, 2B, 3A, 3B, 4A and 4B the cam followers 76 and 80 include radial disc portions 104a and 104b respectively, having a plurality of inwardly facing flat surfaces 106a and 106b, 108a and 108b, 110a and 110b, and 112a and 112b which are parallel to the axis of rotation 114 of the head 10. When the head is in its normal cutting position, the surfaces 106b, 108b, 110b and 112b of the lower cam follower are engaged by the flat surfaces 116b, 118b, 120b and 122b respectively of the generally square lower cam 74. The thickness 132 of the cams 72 and 74 is slightly more than the clearance 134 (FIG. 2) or 136 (FIG. 3). This assures that the lower cam 74 is in complete engagement with the lower cam follower 80 before the flat surfaces 116a, 118a, 120a and 122a of the upper cam 72 rotated 45° from the lower cam 74 are totally disengaged from the surfaces 106a, 108a, 110a and 112a of the upper cam follower 80 and vice versa. It should be noted that prior to release of either cam 72 or 74 the other 74 or 72 must be in position to engage its cam follower thereby making excessive flail release impossible. This is true even in instances where the operator holds the bumper 44 on the ground instead of bouncing it to obtain a flail feed-out When this occurs, only a 45° relative rotation of the spool 24 and the housing 40 is accomplished since the upper cam 72 does not disengage the upper follower 76 until the pressure compressing the spring 92 is relieved. The relative rotational acceleration possible caused by the flails 20 and 22 pulling on the spool 24 retarded by the friction of the spring 92 is insufficient to inflict impact damage on the cams 72 and 74 or the cam followers 76 and 80 during each of the 45° movements.

The relative direction shown by arrow 140 is chosen only for the clarity of operation of the head 10. The head 10, can in fact, be spun in the opposite direction as well, and the cams 72 and 74 and the cam followers 76 and 80 will still provide the 90° relative rotation by interacting with surfaces 154a and 154b, 156a and 156b, 158a and 158b, and 160a and 160b thereon.

Figures 6, 7:
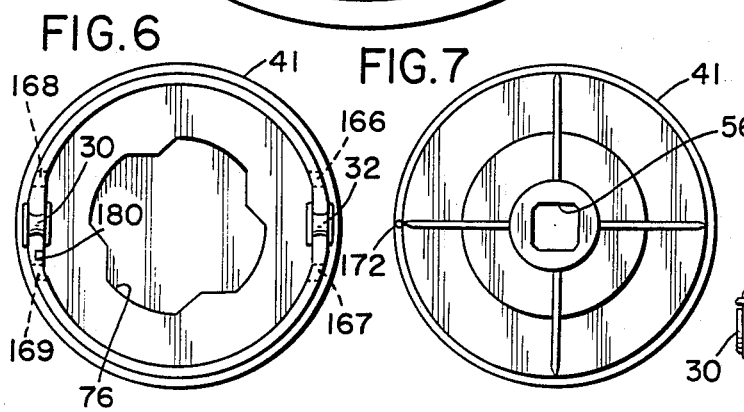
FIG. 6 is a bottom view of the upper portion of the housing of FIG. 1.
FIG. 7 is a top view of the upper portion of the housing shown in FIG. 6.
Figure 5:
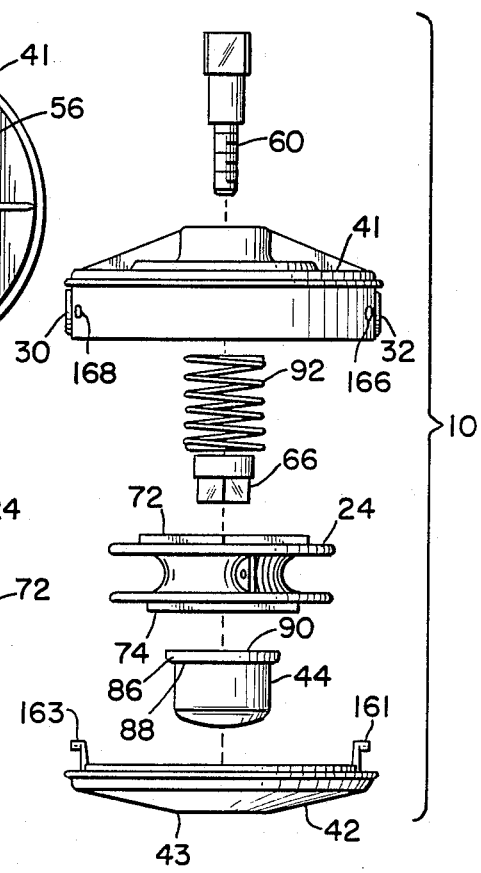
Figure 8:
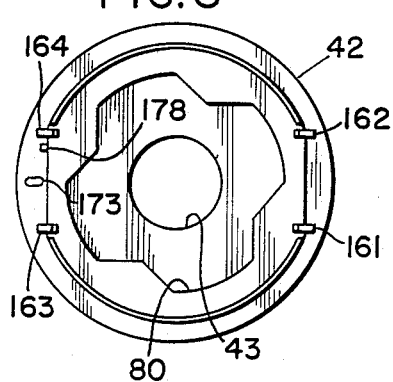
FIG. 8 is a top view of the bottom portion of the housing of FIG. 1.
Figure 9:
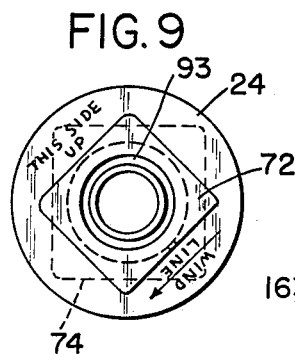
FIG. 9 is a top view of the spool employed in the present invention showing its upper radial surface with the upper cam formed thereon.
Figure 12:
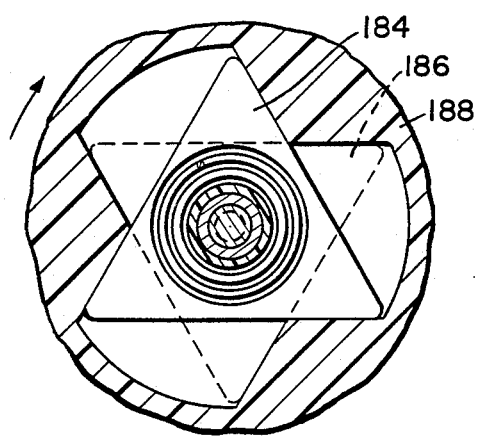
FIG. 12 shows a spool employing triangular shaped upper and lower cams.
Figure 13:
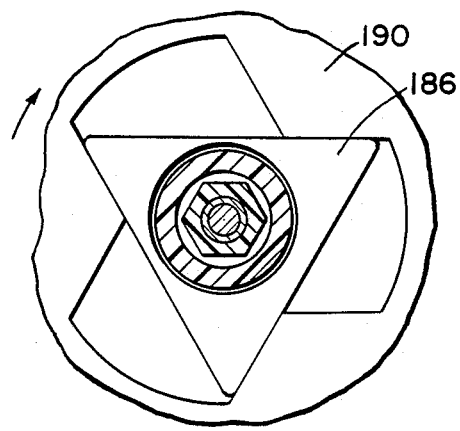
FIG. 13 shows a cam follower for use with the cams of FIG. 12.
Figure 14:
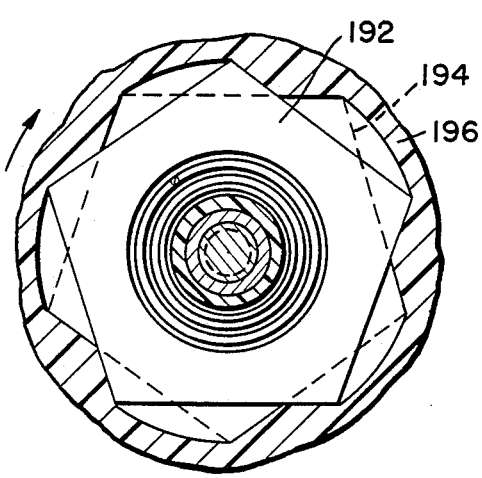
FIG. 14 shows a spool with pentagon shaped upper and lower cams.
Figure 15:
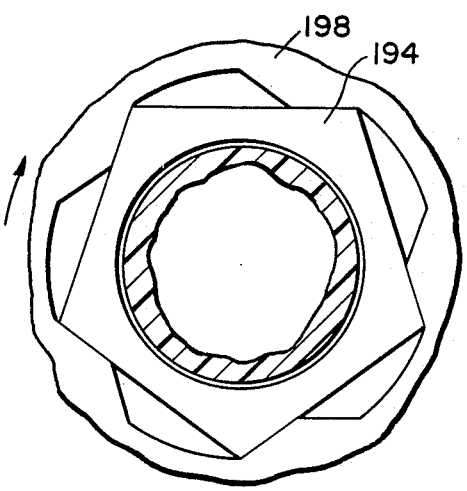
FIG. 15 shows a cam follower for use therewith.

As shown in FIGS. 5 through 11, the upper and lower housing portions 40 and 41 are held together about the bumper 44, spool 24, and the spring 92 by four upwardly extending tangs 162, 164, 166 and 168 which have radially outwardly extending tang tips 169 (FIG. 11). The tangs 162, 164, 166 and 168 are connected to the lower housing portion 42 and the tips 169 extend outwardly to engage the upper housing portion 40 through holes 170, 172, 174 and 176 in the skirt 38 of the upper housing portion 41. The tangs 162, 164, 166 and 168 and the holes 170, 172, 174 and 176 are only used to retain the upper and lower housing portions 41 and 42 in proper relative vertical positioning. Rotational forces are transferred therebetween by means of a pin 178 in the lower housing portion which extends into and indexes with a pin cutout 180 in the upper housing portion as shown in FIGS. 6 and 8. Indicia 181 and 182 such as the "0"s shown in FIGS. 7 and 8, can be used to indicate that the housing portions 41 and 42 are properly indexed for assembly.

When it is desired to disconnect the upper and lower housing portions 41 and 42, forked tools 174 are used to simultaneously force the tangs 161, 162, 163 and 164 out of their respective holes 166, 167, 168 and 169, as shown in FIGS. 10 and 11.

In the alternate embodiment shown in FIG. 11A, the upper and lower housing portions 41 and 42 are retained together on one side by a lever tab 175. The lever tab 175 extends from the upper housing 41 and has a hook end 176 which engages a ledge 177 formed in the lower housing 42. When engaged, the lever tab 175 retains the upper and lower housing portions 41 and 42 together while the tangs 161 and 162, or 163 and 164, and the holes 166 and 167, or 168 and 169 transfer torque therebetween. As can be seen in FIG. 11A, when force in the direction of arrow 178 is applied to the lever tab 175, it disengages from the ledge 177 and allows the upper and lower housing portions 41 and 42 to be disconnected. When it is desired to reconnect the upper and lower housing portions 41 and 42, the opposite tangs 161 and 162, or 163 and 164, and the holes 166 and 167, or 168 and 169 are engaged and the upper and lower housing portions 41 and 42 are pushed together causing the hook end 176 of the lever tab 175 to snap over the ledge 177.

As shown in FIGS. 12 through 15, cams having other numbers of flat sides including three for the cams 184 and 186 of spool 188 mating with three lobed followers, such as follower 190, or five with cams 192 and 194 of spool 196 with five lobed followers 196 are also operable. The number of sides used on the cams and the followers is usually a compromise between surface contact area, ease of manufacture and the desired amount of flail feedout.

All the cams, no matter how many surfaces they have, are symmetrical having an interior angle A between their cam surfaces which engage the follower member. The angle A equals $180°-(360°/S)$ where S is the number of surfaces on each cam. When the cam followers are aligned, the cams are rotationally oriented at an angle C to each other which equals $180°/S$ and the 2S cam follower surfaces that are required have an interior angle F which equals $180°-(180°/S)$.

Thus there has been shown and described a novel automatic flail feedout mechanism which fulfills all the objects and advantages sought therefor. Many changes, modifications, variations, and other uses and applications of the subject invention will, however, become apparent to those skilled in the art after considering the foregoing specification together with the accompanying drawings and claims. All such changes, modifications, variations, and other uses and applications which do not depart from the spirit and scope of the invention are deemed to be covered by the invention which is limited only by the claims which follow.

What is claimed is:

1. A spinning mower head for cutting vegetation extending upward from the ground through the use of a flail including:

a spinnable housing having:
   an axis of rotation,
   at least one cutting flail extending outwardly therefrom;
   an upper housing portion having:
      a downwardly facing inner radial surface, and
      an upper cam follower positioned on said downwardly facing inner radial surface, and
   a lower housing portion having:
      an upwardly facing inner radial surface, and
      a lower cam follower positioned on said upwardly facing inner radial surface,
said upper and lower cam followers each including a plurality of cam follower abutment surfaces parallel to said housing axis of rotation, pairs of said cam follower abutment surfaces on a cam follower joining at about 135° angles,
a spool assembly located between said upper and lower housings and having:
   a common axis of rotation with said spinnable housing;
   bias means urging said spool assembly toward said lower housing,
   a downwardly facing outer radial surface adjacent said upwardly facing inner radial surface,
   a lower cam positioned on said downwardly facing outer radial surface normally held in engagement with said lower cam follower by said bias means,
   an upwardly facing outer radial surface adjacent said downwardly facing inner radial surface, and
   an upper cam positioned on said upwardly facing outer radial surface,
said upper cam having a generally square outer cam surface for engagement with said upper cam follower, and said lower cam having a generally square outer cam surface for engagement with said lower cam follower, and
a bumper member for engagement with the ground, extending through said lower housing portion for contact with said downwardly facing outer radial surface, said cams and cam followers being positioned such that one cam and cam follower are always in position for engagement at predetermined increments in response to the striking of said bumper on the ground, so that incremental relative rotation of said housing and spool assembly is produced by striking said bumper on the ground.

2. The spinning mower head defined in claim 1 wherein said cam surfaces are parallel to said axis of rotation.

3. A mower head for cutting vegetation extending upward from the ground through the use of a flail including:

a housing having
   an axis of rotation,
   at least one cutting flail extending outwardly from a location therefrom,
   a downwardly facing inner radial surface,
   an upper cam follower positioned on said downwardly facing inner radial surface, and
   an upwardly facing inner radial surface,
   a lower cam follower positioned on said upwardly facing inner radial surface,
a spool located between said upwardly and downwardly facing inner radial surfaces, said spool having:
   a common axis of rotation with said housing,
   a cylindrical pocket having a common axis with said housing,
   bias means urging said spool toward said lower cam follower, and including a spring being at least partially located in said pocket and being compressed between said housing and said spool, bias means urging said spool toward said lower cam follower, a downwardly facing outer radial surface adjacent said upwardly facing inner radial surface, a lower cam having a predetermined effective height positioned on said downwardly facing outer radial surface normally held in engagement with said lower cam follower by said bias means, an upwardly facing outer radial surface adjacent said downwardly facing inner radial surface, and an upper cam having a predetermined effective height similar to said effective predetermined height of said lower cam positioned on said upwardly facing outer radial surface and having a predetermined clearance from said upper cam follower when said lower cam is being normally held in engagement with said lower cam follower by said bias means which is less than said predetermined effective height of said lower cam, a bumper member positioned for engagement with the ground and positioned in contact with said spool, whereby striking said bumper on the ground produces momentary upward movement of said spool with respect to said housing to produce incremental relative rotation of said housing and spool, said bumper member including:
a lower foot portion, and
an upper collar portion having:
an upper surface thereon normally in contact with said spool, and
a lower surface, and wherein said housing includes:
an opening through which said lower foot portion extends, and
an abutment surface adjacent said opening for contact with said bumper member upper collar portion lower surface to support said bumper member against said bias means.

4. The mower head defined in claim 3 wherein said housing includes
an upper housing portion including said downwardly facing inner radial surface and said upper cam follower; and
a lower housing portion including said upwardly facing inner radial surface and said lower cam follower; and
means to releasably retain said upper and lower housing portions together in predetermined axial and angular position.

5. The mower head defined in claim 4 wherein said means to releasably retain said upper and lower housing portions together in predetermined axial and angular position include:
first and second pairs of tangs extending upwardly from said lower housing portion, said tangs having tang tips which extend outwardly; and
first and second pairs of orifices radially extending through said upper housing portion in position to be engaged by said tang tips.

6. The spinning mower head defined in claim 5 wherein said means to releasably retain said upper and lower housing portions together in predetermined axial and angular position further include:
an index pin on one of said housing portions;
an index pin receiver on the other of said housing portions; and
indicia means to mark the proper angular position between said upper and lower housing portions.

7. A mower head for a flail-type mower which utilizes a spinning filament-like cutting flail to effect a mowing action, said mower head comprising:
a spinnable housing part having a spin axis, normally upper and lower portions spaced along said axis, and means for connecting said housing part to a driver for spinning said housing part on said axis,
a spool part mounted within said housing part between said housing portions for rotation of said spool part on said axis relative to said housing part and axial movement of said spool part along said axis relative to said housing part between lower and upper positions, and said spool part having normally upper and lower sides facing said upper and lower housing portions, respectively,
spring means acting between said parts urging said spool part to said lower position,
a bumper at the lower side of the spool part and extending below said lower housing portion and adapted to be periodically bumped against the ground during spinning of said head by a driver to alternately press said spool part upwardly relative to said housing part from said lower position to said upper position and then release said spool part for downward return to said lower position by said spring means,
coacting engagable means on said housing portions and spool sides, respectively, operable during spinning of said head by a driver for (a) drivably coupling said parts to one another to effect spinning of said spool part with said housing part when said spool part for rotation through a first given angle in one direction relative to said housing part and then positively blocking further rotation of the spool part in said one direction relative to said housing part in response to axial movement of said spool part from said lower position to said upper position, and (c) releasing said spool part for additional rotation through a second given angle in said one direction relative to said housing part and then positively blocking further rotation of said spool part in said one direction relative to said housing part in response to axial movement of said spool part from said upper position to said lower position, and wherein
said spool part is adapted to contain a filament-like cutting flail with a free end of the flail extending out from said housing part and with the flail wound about the spool part in a direction such that centrifugal force acting on said flail free end during spinning of said head tends to rotate said spool part in said one direction relative to said housing part, whereby each bump of said bumper against the ground during spinning of said housing part by a driver with a flail wound on said spool part effects unwinding of a fixed length of the flail from said spool part.

8. A mower head according to claim 7 wherein:
axial movement of said spool part between said lower and upper positions relative to said housing part occurs through a mid-position midway between said housing portions,
said coacting engagable means comprise lower cam members and follower members mounted on said lower housing portion and said lower spool side, respectively, and upper cam members and follower members mounted on said upper housing portion and said upper spool side, respectively, (a) said lower cam members and follower members are disposed in axial overlapping relation and permit limited relative rotation of said parts between certain first angularly spaced positions and certain second angularly spaced positions of said parts about said axis throughout the range of axial movement of said spool part relative to said housing part from said lower position to a first past-center position slightly above said mid-position; (b) said lower cam members and follower members drivably engage one another to drivably couple said parts to one another for spinning of said spool part by said housing part and positively block rotation of said spool part in said one direction relative to said housing part in said certain first relative angular positions of said parts about said axis and throughout said range of axial movement of said spool part relative to said housing part from said lower position to said first past-center position; and (c) said lower cam members and said follower members disengage one another to release said spool part for rotation in said one direction relative to said housing part throughout the range of axial movement of said spool part relative to said housing part from said first past-center position to said upper position, and wherein further (d) said upper cam members and follower members are disposed in axial overlapping relation and permit limited relative rotation of said parts between said certain first and second angularly spaced positions of said parts throughout the range of axial movement of said spool part relative to said housing part from said upper position to a second past-center position slightly below said mid-position; (e) said upper cam members and follower members drivably engage one another to drivably couple said parts to one another for spinning of said spool part by said housing part and positively block rotation of said spool part in said one direction relative to said housing part in said second relative angular positions of said parts and throughout the range of axial movement of said spool part relative to said housing part from said upper position to said second past-center position; and (f) said upper cam members and follower members disengage one another to release said spool part for rotation in said one direction relative to said housing part throughout the range of axial movement of said spool part relative to said housing part from said second past-center position to said lower position.

9. A mower head according to claim 8 wherein: said upper and lower cam and follower members comprise a first pair of members on said housing part and a second pair of members on said spool part, and the two members of one of said member pairs are angularly displaced about said axis relative to one another to locate said certain second relative angular positions of said parts between said certain first relative angular positions of the parts.

10. A mower head for a flail-type mower which utilizes a spinning filament-like cutting flail to effect a mowing action, said mower head comprising:

a spinnable housing part having a spin axis, normally upper and lower portions spaced along said axis, and means for connecting said housing part to a driver for spinning said housing part on said axis, a spool part mounted within said housing part between said housing portions for rotation of said spool part on said axis relative to said housing part and axial movement of said spool part along said axis relative to said housing part between lower and upper positions, and said spool part having normally upper and lower sides facing said upper and lower housing portions, respectively, spring means acting between said parts urging said spool part to said lower position, a bumper at the lower side of the spool part and extending below said lower housing portion and adapted to be periodically bumped against the ground during spinning of said head by a driver to alternately press said spool part upwardly relative to said housing part from said lower position to said upper position and then release said spool part for downward return to said lower position by said spring means, coacting engagable means on said housing portions and spool sides, respectively, operable during spinning of said head by a driver for (a) drivably coupling said parts to one another to effect spinning of said spool part with said housing part when said spool part occupies said lower position, (b) releasing said spool part for rotation through a first given angle in one direction relative to said housing part and then positively blocking further rotation of the spool part in said one direction relative to said housing part in response to axial movement of said spool part from said lower position to said upper position, and (c) releasing said spool part for additional rotation through a second given angle in said one direction relative to said housing part and then positively blocking further rotation of said spool part in said one direction relative to said housing part in response to axial movement of said spool part from said upper position to said lower position, and wherein said spool part is adapted to contain a filament-like cutting flail with a free end of the flail extending out from said housing part and with the flail wound about the spool part in a direction such that centrifugal force acting on said flail free end during spinning of said head tends to rotate said spool part in said one direction relative to said housing part, whereby each bump of said bumper against the ground during spinning of said housing part by a driver with a flail wound on said spool part effects unwinding of a fixed length of the flail from said spool part, axial movement of said spool part between said lower and upper positions relative to said housing part occurs through a mid-position midway between said housing portions, said coacting engagable means comprise lower cam members and follower members mounted on said lower housing portion and said lower spool side, respectively, and upper cam members and follower members mounted on said upper housing portion and said upper spool side, respectively, said lower cam and follower members are disposed to (a) drivably engage one another and thereby drivably couple said parts to one another for spinning said spool part with said housing part and positively blocking rotation of said spool part in said one direction relative to said housing part in certain first relative angular positions of said parts about said axis and throughout the range of axial movement of said spool part relative to said housing part from said lower position to a first past-center position slightly above said mid-position, and (b) disengage one another and thereby release said spool part for rotation in said one direction relative to said housing part throughout the range of axial movement of said spool part relative to said housing part from said first past-center position to said upper position, said upper cam and follower members are disposed to (a) drivably engage one another and thereby drivably couple said parts to one another for spinning said spool part with said housing part and positively blocking rotation of said spool part in said one direction relative to said housing part in certain second relative angular positions of said parts about said axis between said certain first relative angular positions of said parts and throughout the range of axial movement of said spool part relative to said housing part from said upper position to a second past-center position slightly below said mid-position, and (b) disengage one another and thereby release said spool part for rotation in said one direction relative to said housing part throughout the range of axial movement of said spool part relative to said housing part from said second past-center position to said lower position, said cam members have radially outer polygonal perimeters coaxial with said axis, and said follower members have polygonal openings coaxial with said axis for reciving their respective cam members in said certain first and second relative positions of said parts.

11. A mower head according to claim 8 wherein:

said housing part has an upper opening on said axis extending through said upper housing portion for receiving a driver for spinning said housing part, and a lower opening on said axis extending through said lower housing portion and through which said bumper extends below said lower housing portion.

12. A mower head according to claim 11 wherein:

said upper and lower cam and follower members comprise a first pair of members on said housing part and a second pair of members on said spool part, and the members of one of said member pairs are relatively angularly displaced about said axis.

13. A mower head for a flail-type mower which utilizes a spinning filament-like cutting flail to effect a mowing action, said mower head comprising:

a spinnable housing part having a spin axis, normally upper and lower portions spaced along said axis, and means for connecting said housing part to a driver for spinning said housing part on said axis, a spool part mounted within said housing part between said housing portions for rotation of said spool part on said axis relative to said housing part and axial movement of said spool part along said axis relative to said housing part between lower and upper positions, and said spool part having normally upper and lower sides facing said upper and lower housing portions, respectively, spring means acting between said parts urging said spool part to said lower positions, a bumper at the lower side of the spool part and extending below said lower housing portion and adapted to be periodically bumped against the ground during spinning of said head by a driver to alternately press said spool part upwardly relative to said housing part from said lower position to said upper position and then release said spool part for downward return to said lower position by said spring means, coacting engagable means on said housing portions and spool sides, respectively, operable during spinning of said head by a driver for (a) drivably coupling said parts to one another to effect spinning of said spool part with said housing part when said spool part occupies said lower position, (b) releasing said spool part for rotation through a first given angle in one direction relative to said housing part and then positively blocking further rotation of the spool part in said one direction relative to said housing part in response to axial movement of said spool part from said lower position to said upper position, and (c) releasing said spool part for additional rotation through a second given angle in said one direction relative to said housing part and then positively blocking further rotation of said spool part in said one direction relative to said housing part in response to axial movement of said spool part from said upper position to said lower position, and wherein said spool part is adapted to contain a filament-like cutting flail with a free end of the flail extending out from said housing part and with the flail wound about the spool part in a direction such that centrifugal force acting on said flail free end during spinning of said head tends to rotate said spool part in said one direction relative to said housing part, whereby each bump of said bumper against the ground during spinning of said housing part by a driver with a flail wound on said spool part effects unwinding of a fixed length of the flail from said spool part, said housing part has an upper opening on said axis extending through said upper housing portion for receiving a driver for spinning said housing part, and a lower opening on said axis extending through said lower housing portion and through which said bumper extends below said lower housing portion, axial movement of said spool part between said lower and upper positions relative to said housing part occurs through a mid-position midway between said housing portions, said coacting engagable means comprise lower cam members and follower members mounted on said lower housing portion and said lower spool side, respectively, and upper cam members and follower members mounted on said upper housing portion and said upper spool side, respectively, said lower cam and follower members are disposed to (a) drivably engage one another and thereby drivably couple said parts to one another for spinning said spool part with said housing part and positively blocking rotation of said spool part in said one direction relative to said housing part in certain first relative angular positions of said parts about said axis and throughout the range of axial movement of said spool part relative to said housing part from said lower position to a first past-center position slightly above said mid-position, and (b) disengage one another and thereby release said spool part for rotation in said one direction relative to said housing part throughout the range of axial movement of said spool part relative to said housing part from said first past-center position to said upper position, said upper cam and follower members are disposed to (a) drivably engage one another and thereby drivably couple said parts to one another for spinning said spool part with said housing part and positively blocking rotation of said spool part in said one direction relative to said housing part in certain second relative angular positions of said parts about said axis between said certain first relative angular positions of said parts and throughout the range of axial movement of said spool part relative to said housing part from said upper position to a second past-center position slightly below said mid-position, and (b) disengage one another and thereby release said spool part for rotation in said one direction relative to said housing part throughout the range of axial movement of said spool part relative to said housing part from said second past-center position to said lower position, said upper and lower cam and follower members comprise a first pair of members on said housing part and a second pair of members on said spool part, and the members of one of said member pairs are relatively angularly displaced about said axis, said cam members have radially outer polygonal perimeters coaxial with said axis, and said follower members have polygonal openings coaxial with said axis for reciving their respective cam members in said first and second relative angular positions of said housing and spool parts.

14. A spinning mower head for cutting vegetation extending upward from the ground through the use of a flail including:

a spinnable housing having:
an axis of rotation,
at least one cutting flail extending outwardly therefrom;
an upper housing portion having:
a downwardly facing inner radial surface; and
an upper cam follower positioned on said downwardly facing inner radial surface, and
a lower housing portion having:
an upwardly facing inner radial surface, and
a lower cam follower positioned on said upwardly facing inner radial surface,
a spool assembly located between said upper and lower housings having:
a common axis of rotation with said spinnable housing;
bias means urging said spool assembly toward said lower housing,
a downwardly facing outer radial surface adjacent said upwardly facing inner radial surface,
a lower cam positioned on said downwardly facing outer radial surface normally held in engagement with said lower cam follower by said bias means,
an upwardly facing outer radial surface adjacent said downwardly facing inner radial surface, and
an upper cam positioned on said upwardly facing outer radial surface, a bumper member for engagement with the ground, extending through said lower housing portion for contact with said downwardly facing outer radial surface, said cams and cam followers being positioned such that one cam and cam follower are always in position for engagement at predetermined increments in response to the striking of said bumper on the ground, so that incremental relative rotation of said housing and spool assembly is produced by striking said bumper on the ground, said upper and lower cams having a predetermined height, said upper cam clearing said upper cam follower when said bumper member has not moved said spool assembly by a distance which is less than said predetermined height, and said mower head further comprises retention means between said upper and lower housing portions, said retention means including:
a pair of tangs extending upwardly from said lower housing portion, said tangs having outwardly extending tang tips,
a pair of orifices extending through said upper housing portion in position to be engaged by said tang tips,
a lever tab extending downwardly from said upper housing having:
a hook end, and
a ledge formed in said lower housing positioned for engagement with said hook end, said hook end being releasably disconnectable from said ledge by forced movement toward said axis, which movement and inward movement of said tang tips being resisted by centrifugal force generated by the spinning of said spinning mower head.

* * * * *